(12) United States Patent
Tokozakura et al.

(10) Patent No.: US 11,289,747 B2
(45) Date of Patent: Mar. 29, 2022

(54) BATTERY COOLING SYSTEM

(71) Applicant: TOYOTA JIDOSHA KABUSHIKI KAISHA, Toyota (JP)

(72) Inventors: Daisuke Tokozakura, Susono (JP); Satoshi Tominaga, Susono (JP); Yushi Seki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 16/032,506

(22) Filed: Jul. 11, 2018

(65) Prior Publication Data
US 2019/0036181 A1 Jan. 31, 2019

(30) Foreign Application Priority Data

Jul. 27, 2017 (JP) .............................. JP2017-145828
Oct. 19, 2017 (JP) .............................. JP2017-202487

(51) Int. Cl.
*H01M 10/613* (2014.01)
*H01M 10/6567* (2014.01)
(Continued)

(52) U.S. Cl.
CPC ........... *H01M 10/613* (2015.04); *B60K 11/02* (2013.01); *B60L 1/003* (2013.01); *B60L 3/003* (2013.01);
(Continued)

(58) Field of Classification Search
CPC ............. H01M 10/613; H01M 10/653; H01M 10/6556; H01M 10/6567; H01M 10/6568;
(Continued)

(56) References Cited

U.S. PATENT DOCUMENTS

| 5,921,533 A | 7/1999 | Miyamoto et al. |
| 2005/0089750 A1* | 4/2005 | Ng .................... H01M 10/6557 |
| | | 429/120 |

(Continued)

FOREIGN PATENT DOCUMENTS

| JP | H10-113834 A | 5/1998 |
| JP | H11-307139 A | 11/1999 |

(Continued)

OTHER PUBLICATIONS

JP2009161604A Kurosawa et al. Espacenet machine translation (Year: 2009).*

*Primary Examiner* — Cynthia H Kelly
*Assistant Examiner* — Kirsten B Tysl
(74) *Attorney, Agent, or Firm* — Oliff PLC

(57) ABSTRACT

A battery cooling system includes: a cooling circuit; a power transmission device disposed in the cooling circuit, the power transmission device including a gear; a drivetrain oil having an electric insulating property and being used for lubrication of the gear, the drivetrain oil circulating in the cooling circuit; a battery unit disposed in the cooling circuit, the battery unit including a module case that houses a plurality of battery cells; a pump disposed in the cooling circuit; and a radiator disposed in the cooling circuit, the radiator releasing heat from the drivetrain oil flowing in the cooling circuit. The drivetrain oil performs direct heat exchange inside the power transmission device and flows through an inside of the module case and performs direct heat exchange with the battery cells.

5 Claims, 11 Drawing Sheets

(51) Int. Cl.
    *H01M 10/66*     (2014.01)
    *B60L 58/26*     (2019.01)
    *H01M 10/6568*     (2014.01)
    *H01M 10/653*     (2014.01)
    *B60L 3/00*     (2019.01)
    *B60K 11/02*     (2006.01)
    *H01M 10/6556*     (2014.01)
    *H01M 6/50*     (2006.01)
    *B60L 1/00*     (2006.01)
    *B60L 50/64*     (2019.01)
    *B60L 50/60*     (2019.01)
    *H01M 50/20*     (2021.01)
    *B60K 1/00*     (2006.01)

(52) U.S. Cl.
    CPC ............. *B60L 3/0046* (2013.01); *B60L 50/64* (2019.02); *B60L 50/66* (2019.02); *B60L 58/26* (2019.02); *H01M 6/5038* (2013.01); *H01M 10/653* (2015.04); *H01M 10/6556* (2015.04); *H01M 10/6567* (2015.04); *H01M 10/6568* (2015.04); *H01M 10/66* (2015.04); *H01M 50/20* (2021.01); *B60K 2001/003* (2013.01); *B60K 2001/005* (2013.01)

(58) Field of Classification Search
    CPC .... H01M 10/66; H01M 50/20; H01M 6/5038; B60L 50/64; B60L 50/66; B60L 58/26; B60L 1/003; B60L 3/003; B60L 3/0046; B60K 11/02; B60K 2001/003; B60K 2001/005

See application file for complete search history.

(56) References Cited

U.S. PATENT DOCUMENTS

| | | | |
|---|---|---|---|
| 2006/0291261 | A1 | 12/2006 | Ohnishi et al. |
| 2007/0087266 | A1* | 4/2007 | Bourke ............... H01M 50/502 429/159 |
| 2012/0009457 | A1* | 1/2012 | Lee ................... H01M 10/6557 429/120 |
| 2013/0000325 | A1 | 1/2013 | Asai et al. |
| 2013/0030643 | A1 | 1/2013 | Nishizawa |
| 2016/0355100 | A1 | 12/2016 | Ito et al. |

FOREIGN PATENT DOCUMENTS

| | | | |
|---|---|---|---|
| JP | 2005-151747 | A | 6/2005 |
| JP | 2009161604 | A * | 7/2009 |
| JP | 2011-179690 | A | 9/2011 |
| JP | 2012-062778 | A | 3/2012 |
| JP | 2013-177043 | A | 9/2013 |
| JP | 2016-095960 | A | 5/2016 |
| WO | 2011/142024 | A1 | 11/2011 |
| WO | 2012/120592 | A1 | 9/2012 |
| WO | 2012/136929 | A1 | 10/2012 |
| WO | 2017/017867 | A1 | 2/2017 |

* cited by examiner

BATTERY COOLING SYSTEM

INCORPORATION BY REFERENCE

The disclosure of Japanese Patent Application No. 2017-145828 filed on Jul. 27, 2017 including the specification, drawings and abstract is incorporated herein by reference in its entirety.

BACKGROUND

1. Technical Field

The present disclosure relates to a battery cooling system.

2. Description of Related Art

Japanese Patent Application Publication No. 11-307139 (JP 11-307139A) discloses a battery cooling system in which a silicon oil having an electric insulation property is charged and a refrigerant piping for cooling the silicon oil is provided inside a sealed container that houses batteries.

SUMMARY

In the configuration described in JP 11-307139A, it is necessary that the refrigerant piping be provided inside the sealed container, resulting in an increase in size of the sealed container. Also, a refrigerant flowing inside the refrigerant piping is a refrigerant of a refrigeration cycle for vehicle air conditioning, and thus, a compressor that circulates the refrigerant is required, resulting in an increase in size of the entire system.

Furthermore, in the configuration described in JP 11-307139A, the refrigerant flowing inside the refrigerant piping exchanges heat with the batteries via the silicon oil, and thus heat resistance between the batteries and the refrigerant is large, which may result in failure to provide sufficient cooling capability.

The present disclosure provides a battery cooling system that provides a high cooling capability while reducing the size.

An exemplary aspect of present disclosure is a battery cooling system. The battery cooling system includes: a cooling circuit; a power transmission device disposed in the cooling circuit, the power transmission device including a gear; a drivetrain oil having an electric insulating property and being used for lubrication of the gear, the drivetrain oil circulating in the cooling circuit; a battery unit disposed in the cooling circuit, the battery unit including a module case that houses a plurality of battery cells; a pump disposed in the cooling circuit, the pump supplying the drivetrain oil to the battery unit and circulating the drivetrain oil inside the cooling circuit; and a radiator disposed in the cooling circuit, the radiator releasing heat from the drivetrain oil flowing in the cooling circuit. The drivetrain oil performs direct heat exchange inside the power transmission device and flows through an inside of the module case and performs direct heat exchange with the battery cells. An exemplary aspect of present disclosure is a battery cooling system. The battery cooling system includes: a cooling circuit in which a drivetrain oil used for lubrication of a gear of a power transmission device circulates, the drivetrain oil having an electric insulation property; the power transmission device disposed in the cooling circuit; a battery unit disposed in the cooling circuit, the battery unit including a module case that houses a plurality of battery cells; a pump disposed in the cooling circuit, the pump supplying the drivetrain oil to the battery unit and circulating the drivetrain oil inside the cooling circuit; and a radiator disposed in the cooling circuit, the radiator releasing heat from the drivetrain oil flowing in the cooling circuit. The drivetrain oil performs direct heat exchange inside the power transmission device, and flows through an inside of the module case and performs direct heat exchange with the battery cells.

The above configuration enables the battery cells to be directly cooled by the drivetrain oil flowing inside the module case. Accordingly, the capability of cooling a separator and an electrolyte inside each battery cell is enhanced. Furthermore, decrease in battery life due to heat can be suppressed. Also, the need for a refrigerant piping such as those in conventional structures is eliminated, enabling reduction in size of the module case.

The battery unit may include a battery pack that houses a plurality of the module cases. Inside the battery pack, the module cases may be connected via a tube such that the drivetrain oil flows through the module cases; and the drivetrain oil that has flowed into the battery pack may flow to an outside of the battery pack via the plurality of the module cases.

The above configuration enables the drivetrain oil for directly cooling the battery cells to flow inside the plurality of module cases. Accordingly, even where a plurality of module cases are housed inside a battery pack, the plurality of battery cells housed inside each module case can sufficiently be cooled and an increase in size of the battery pack can be suppressed.

In the cooling circuit, the plurality of the module cases may be connected in series such that a flow pathway of the drivetrain oil flowing inside the battery pack becomes a series flow pathway.

According to the above configuration, the module cases are connected in series via a tube such that the drivetrain oil can flow through the module cases, whereby a flow rate of the drivetrain oil is increased and the capability of cooling the battery cells is enhanced.

In the cooling circuit, the plurality of the module cases may be connected in parallel such that a flow pathway of the drivetrain oil flowing inside the battery pack becomes a parallel flow pathway.

According to the above configuration, the plurality of module cases are connected in parallel via a tube such that the drivetrain oil can flow through the plurality of module cases, whereby a supply temperature of the drivetrain oil is lowered and the capability of cooling the battery cells is enhanced.

The module case may have a rectangular parallelepiped shape in which an inlet for the drivetrain oil and an outlet for the drivetrain oil are provided in vicinities of mutually opposite corner positions as the module case is viewed from an upper side.

According to the above configuration, the drivetrain oil flows between the opposite corners inside the module case, whereby a flow speed of the drivetrain oil inside the module case becomes uniform, non-uniformity of cooling inside the module case is prevented and the capability of cooling the battery cells is enhanced.

A limit temperature of the battery unit may be lower than a limit temperature of the power transmission device; and the drivetrain oil that has flowed out from the radiator may be supplied to the power transmission device after flowing through the battery unit.

According to the above configuration, during cooling, the drivetrain oil cooled by the radiator is supplied to components in ascending order of limit temperatures. Therefore, the cooling capability is enhanced in the entire battery cooling system and the temperature of the drivetrain oil supplied to the battery unit is lowered, whereby the capability of cooling the battery cells is enhanced.

The drivetrain oil may have a pour point of no more than −30° C.

According to the above configuration, the drivetrain oil can be present in the form of a drivetrain oil even at a low temperature. Therefore, a necessary flow rate can be ensured by the pump, enabling suppression of an increase in size of the pump. Consequently, an increase in size of the entire battery cooling system can be suppressed.

The cooling circuit may include a power control unit that converts direct-current electric power output by the battery unit into alternate-current electric power; and the drivetrain oil may flow through an inside of a case of the power control unit and performs direct heat exchange with an electronic device housed inside the case.

According to the above configuration, the battery unit and the power control unit can be cooled by the same drivetrain oil circulating inside the cooling circuit. Also, since the drivetrain oil has an electric insulation property, the electronic device inside the power control unit can be cooled directly by the drivetrain oil. Consequently, the capability of cooling the power control unit is enhanced.

The present disclosure enables battery cells inside a module case to be cooled directly by a drivetrain oil circulating inside a cooling circuit. Consequently, the need for a refrigerant piping and a compressor such as those in conventional structures is eliminated, whereby an increase in size of the module case can be suppressed, an increase in size of the entire battery cooling system can be suppressed and the capability of cooling the battery cells can be enhanced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A battery cooling system according to an embodiment of the present disclosure will be described in detail below with reference to the drawings.

Figure 1:
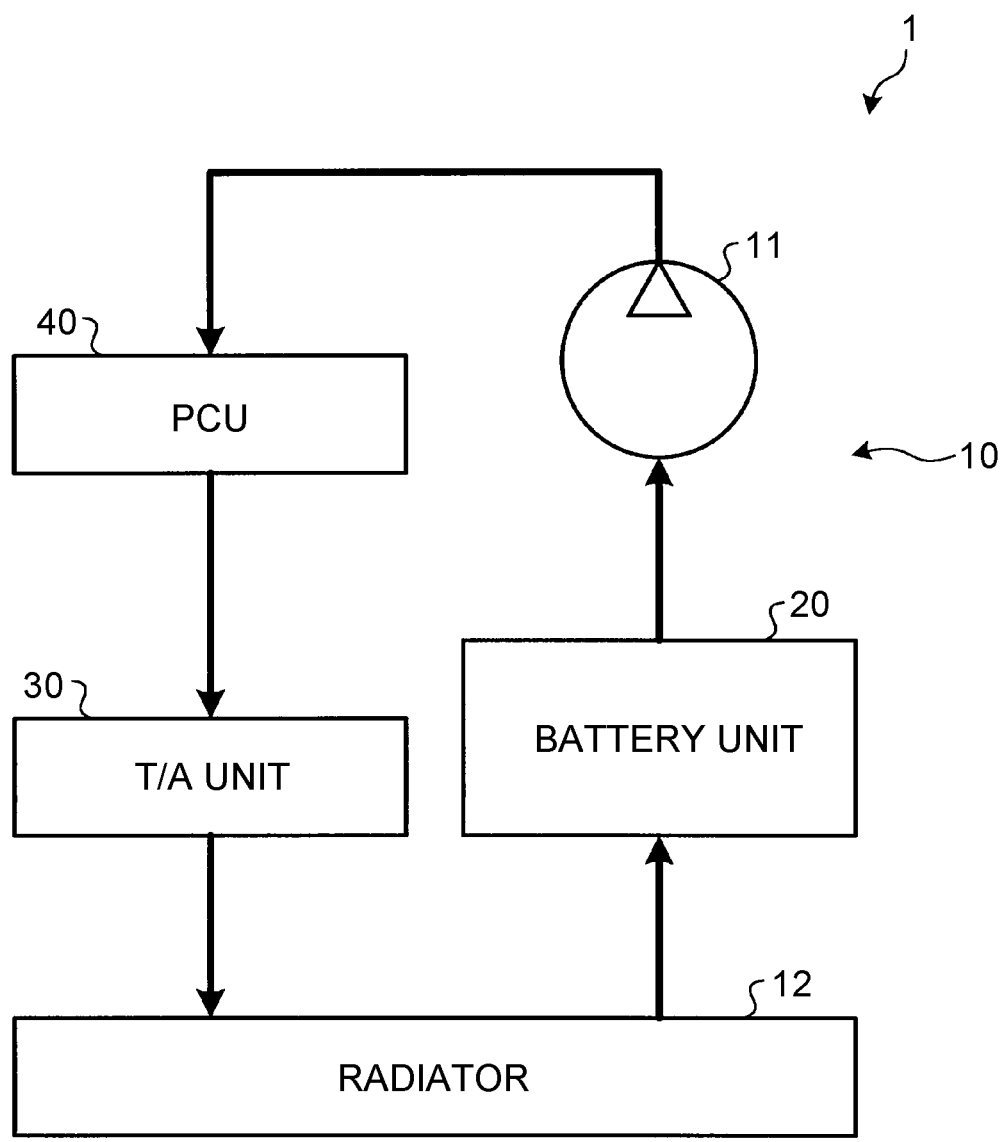
FIG. 1 is a diagram schematically illustrating a battery cooling system according to an embodiment.

FIG. 1 is a diagram schematically illustrating a battery cooling system 1 according to an embodiment. The battery cooling system 1 includes a cooling circuit 10 in which a liquid having an electric insulation property circulates. The liquid circulating inside the cooling circuit 10 is, for example, a liquid having a high electric insulation property such as silicon oil or fluorine oil. Also, the liquid is small in polarity, has a boiling point of no less than 100° C. and a flash point of no less than 70° C., and where the liquid is an oil, the liquid has a pour point of no more than −30° C. The arrows illustrated in FIG. 1 indicate a direction in which the liquid flows inside the cooling circuit 10 (circulation direction).

The battery cooling system 1 according to the present embodiment is mounted on an electric vehicle including a battery. Then, the battery cooling system 1 cools or warms the battery unit 20 via the liquid flowing inside the cooling circuit 10. The battery unit 20 is a secondary battery that supplies electric power to a motor, which is a power source for an electric vehicle to travel. Also, in the cooling circuit 10, a transaxle unit (hereinafter referred to as "T/A unit") 30, which is a power transmission device for an electric vehicle, is disposed in addition to the battery unit 20. In other words, the liquid circulating inside the cooling circuit 10 is a drivetrain oil used for lubrication and cooling of the T/A unit 30. The drivetrain oil has at least an electric insulation property from among the aforementioned properties of the liquid. As described above, in the battery cooling system 1, the battery unit 20 is cooled or warmed using the drivetrain oil supplied to the T/A unit 30. In the description of the present embodiment, the drivetrain oil is simply referred to as the "oil".

The cooling circuit 10 includes a pump 11, a power control unit (hereinafter referred to as "PCU") 40, the T/A unit 30, a radiator 12 and the battery unit 20.

The pump 11 is an oil pump that circulates the oil inside the cooling circuit 10. The oil discharged from the pump 11 flows through the PCU 40, the T/A unit 30, the radiator 12 and the battery unit 20 in this order. Furthermore, in the cooling circuit 10, the respective components are disposed in ascending order of limit temperatures on the downstream side of the radiator 12. A limit temperature is an upper value of a temperature range in which a component can normally operate. As illustrated in FIG. 1, on the downstream side, in the liquid circulation direction, of the radiator 12, the respective components are disposed in the order of the battery unit 20, the PCU 40 and T/A unit 30. In other words, the limit temperature of the battery unit 20 is lower than the limit temperature of the PCU 40, and the limit temperature of the PCU 40 is lower than the limit temperature of the T/A unit 30. Here, the pump 11 may be a mechanical pump or an electric pump.

The PCU 40, which is a device that controls the battery unit 20 and the motor, converts direct-current electric power output from the battery unit 20 into alternate-current electric power and supplies the alternate-current electric power to the motor. The PCU 40 includes, e.g., an inverter. Also, the PCU 40 includes a non-illustrated inverter case that houses electric devices such as inverter elements. In the inverter case, an inlet via which the oil circulating inside the cooling circuit 10 flows into the PCU 40 and an outlet via which the oil flowing through the PCU 40 flows to the outside of the PCU 40 are provided. The oil supplied from the pump 11 to the PCU 40 performs heat exchange directly with the inverter elements inside the inverter case and then flows out from the outlet. Since the inverter elements are heat sources of the PCU 40, the inverter elements in the PCU 40 are cooled by the oil circulating inside the cooling circuit 10. The oil that has flowed out from the PCU 40 flows into the T/A unit 30.

The T/A unit 30 is a power transmission device that transmits power from the motor to drive wheels. The T/A unit 30 includes, e.g., a transmission including, e.g., non-illustrated gears, and a differential. Also, the T/A unit 30 includes a transaxle case (T/A case) that houses the transmission and the differential. In the T/A case, an inlet via which the oil circulating inside the cooling circuit 10 flows in and an outlet via which the oil flows out are provided. As a result of the oil inside the cooling circuit 10 being supplied to the T/A unit 30, the T/A unit 30 is lubricated and cooled. The oil that has flowed out from the T/A unit 30 flows into the radiator 12.

The radiator 12 is an oil cooler that releases heat of the oil circulating inside the cooling circuit 10. For example, the radiator 12 is a radiator (air cooling-type oil cooler) to be mounted in an electric vehicle. The oil flowing inside the cooling circuit 10 is cooled by the radiator 12 after heat exchange with the battery unit 20 and the PCU 40. The oil that has flowed out from the radiator 12 flows into the battery unit 20.

The battery unit 20 includes a plurality of battery modules each including a plurality of battery cells and a battery pack 21 (illustrated in FIG. 2) that houses the plurality of battery modules. Then, in the cooling circuit 10, the oil flowing into the battery unit 20 flows through the inside of each battery module and thereby exchanges heat directly with the relevant battery cells.

Figure 2:
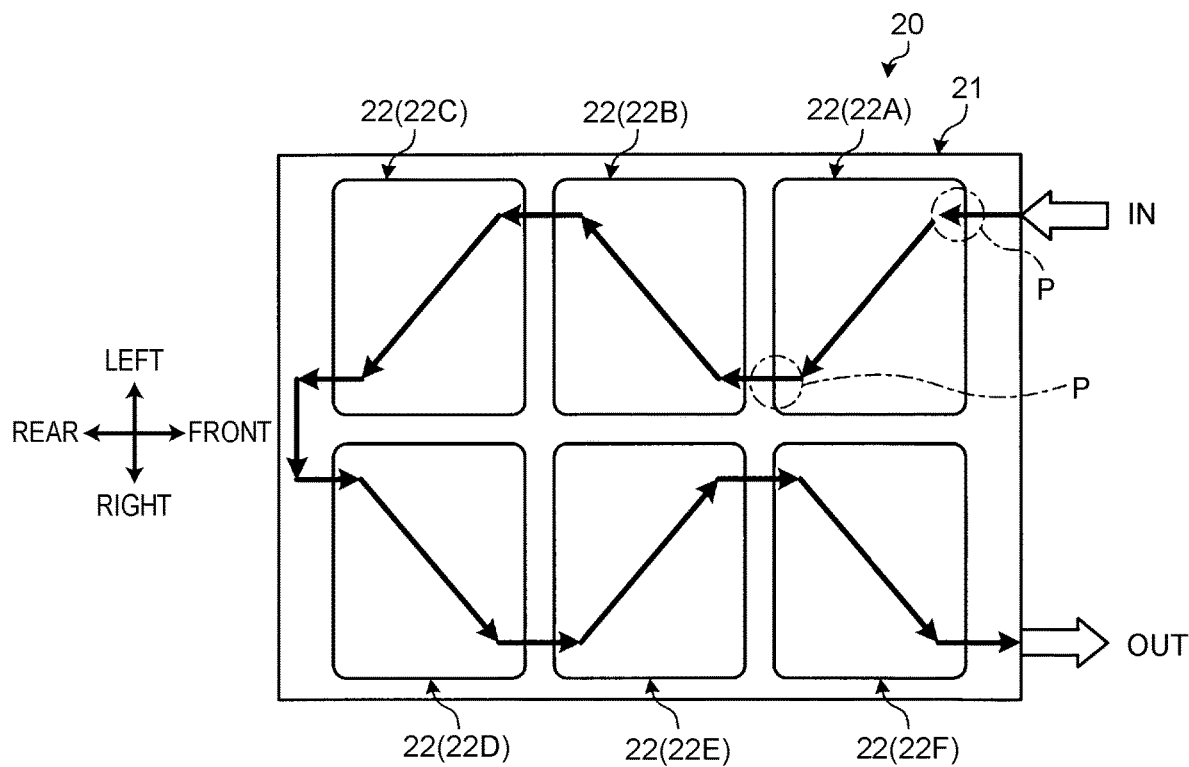
FIG. 2 is a schematic diagram for describing a flow of an oil inside a battery unit.

FIG. 2 is a diagram for describing a flow of the oil inside the battery unit 20. FIG. 2 is a schematic skeleton diagram of the battery unit 20 where the battery unit 20 is assembled to a vehicle, as the vehicle is viewed from the upper side. "As the vehicle is viewed from the upper side" means a case where a vehicle is viewed from the upper side in a direction orthogonal to a horizontal direction. The directions, the front, the rear, the right and the left, indicated in FIG. 2 indicate the front-back direction and the right-left direction of the vehicle.

As illustrated in FIG. 2, in the battery unit 20, a plurality of module cases 22 each forming a battery module are housed inside the battery pack 21. A plurality of battery cells are housed inside the module case 22. In each battery module, the plurality of battery cells housed inside the module case 22 are electrically connected. For example, one battery module is formed by one module case 22. Then, the oil flowing inside the battery pack 21 flows through the insides of all the module cases 22 and then flows to the outside of the battery pack 21.

The battery pack 21 is a case having a substantially rectangular parallelepiped shape having a substantially rectangular shape as viewed from the upper side. In the example illustrated in FIG. 2, inside the battery pack 21, a total of six module cases 22 (22A to 22F) are housed in such a manner that the module cases 22 are arranged in two rows in the right-left direction and in three rows in the front-back direction. Each module case 22 is a case having a substantially rectangular parallelepiped shape having a substantially rectangular shape as the battery pack 21 is viewed from the upper side.

Furthermore, in the example illustrated in FIG. 2, the module cases 22 are connected in series such that the flow of the oil inside the battery pack 21 follows a tandem flow pathway. More specifically, a first module case 22A, a second module case 22B, a third module case 22C, a fourth module case 22D, a fifth module case 22E and a sixth module case 22F are connected in this order from the upstream side toward the downstream side via respective rubber tubes such that the oil can flow therethrough.

Also, the module cases 22 are connected such that in each module case 22, the oil flows between opposite corners of the module case 22. The opposite corners mean opposite corners of the module case 22 having a substantially rectangular shape in plan view (top view) in FIG. 2. In each module case 22, an inlet and an outlet for the oil are provided in the respective vicinities P of opposite corner positions, which are each surrounded by an alternate long and short dash line in FIG. 2.

Figure 3:
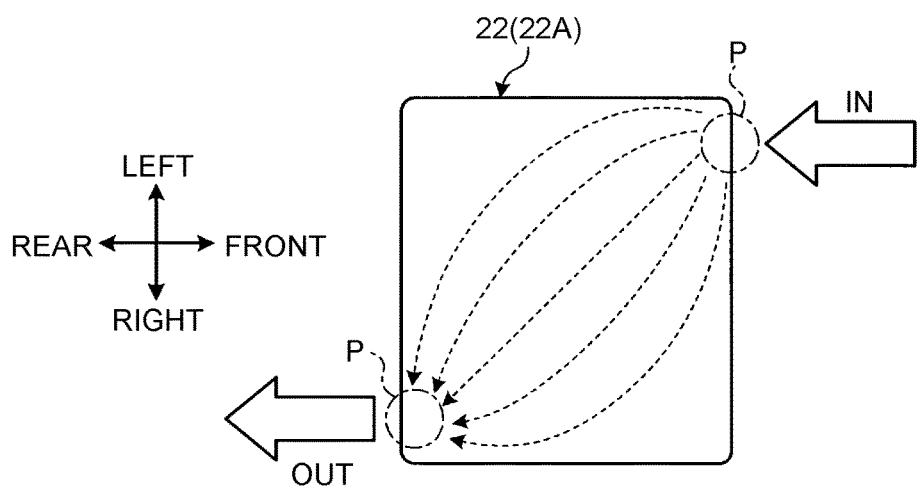
FIG. 3 is a schematic diagram for describing a flow of the oil inside a module case.

FIG. 3 is a diagram for describing the flow of the oil in a module case 22. As illustrated in FIG. 3, in each module case 22, an inlet and an outlet are provided in the vicinities P of opposite corner positions in the module case 22, which are each surrounded by an alternate long and short dash line, to cause the oil inside the module case 22 to flow toward the opposite corner. In FIG. 3, the first module case 22A in FIG. 2 is illustrated as an example.

Figure 4:
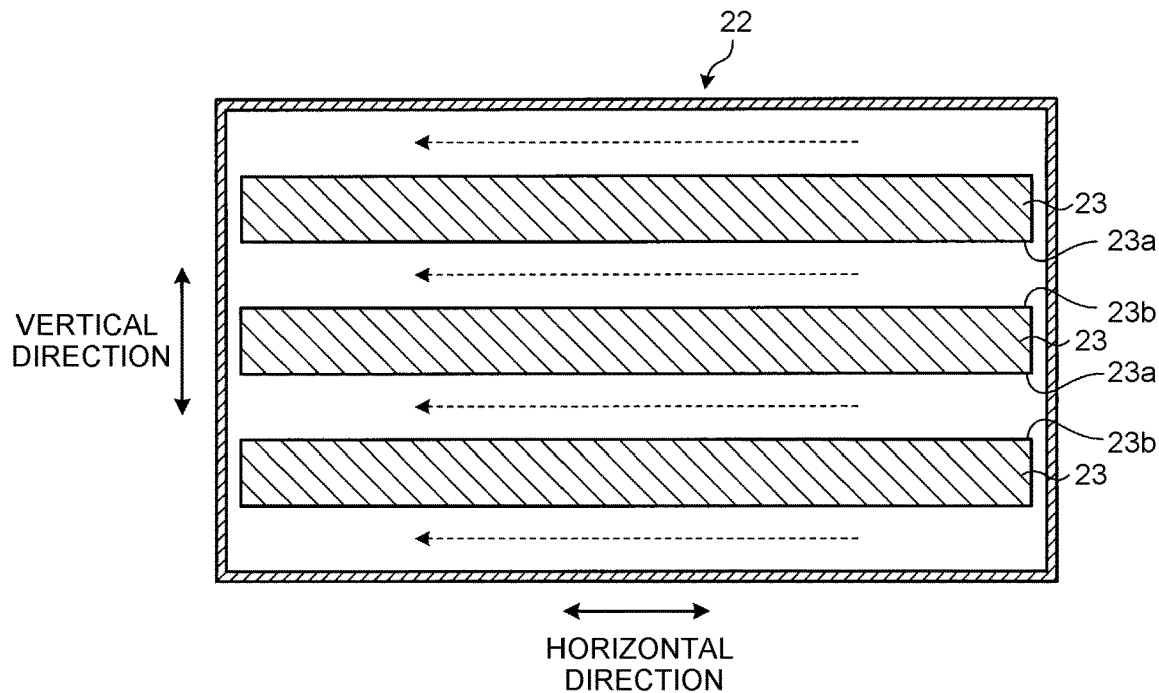
FIG. 4 is a diagram for describing a flow of the oil inside a module case that houses laminated battery cells.
Figure 5:
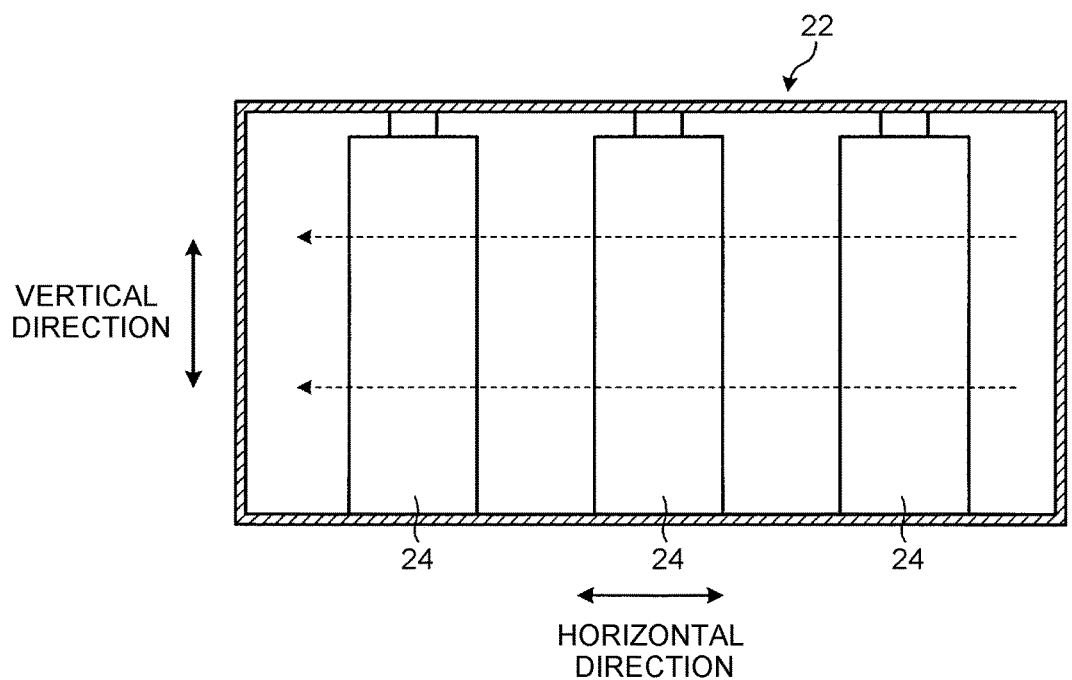
FIG. 5 is a diagram for describing a flow of the oil inside a module case that houses cylindrical battery cells.

Also, the battery cells housed inside each module case 22 may be laminated battery cells 23 (illustrated in FIG. 4) or cylindrical battery cells 24 (illustrated in FIG. 5). In other words, each battery module housed inside the battery pack 21 may be either a module including laminated battery cells 23 or a module including cylindrical battery cells 24.

FIG. 4 is a diagram for describing a flow of the oil inside a module case 22 that houses laminated battery cells 23. In the case of a battery module including a plurality of laminated battery cells 23, the plurality of laminated battery cells 23 are horizontally disposed inside the module case 22 in such a manner that the plurality of laminated battery cells 23 are stacked on one another in the vertical direction. Then, as indicated by dashed arrows in FIG. 4, the oil inside the module case 22 flows horizontally between respective two laminated battery cells 23 facing each other in the vertical direction. In this case, the oil flows between lower surfaces 23a of laminated battery cells 23 on the upper side and upper surfaces 23b of corresponding laminated battery cells 23 on the lower side, and thus, the oil directly contacts bodies of the laminated battery cells 23 (cell bodies). The oil inside the module case 22 exchanges heat directly with all the laminated battery cells 23 while flowing inside the module case 22. Here, the horizontal direction indicated in FIG. 4 is a direction that includes the front-rear direction and the right-left direction indicated in FIGS. 2 and 3, and is orthogonal to the vertical direction.

FIG. 5 is a diagram for describing a flow of the oil inside a module case 22 that houses cylindrical battery cells 24. In the case of a battery module including a plurality of cylindrical battery cells 24, inside the module case 22, the plurality of cylindrical battery cells 24 are disposed so as to stand in the vertical direction. Then, as indicated by dashed arrows in FIG. 5, the oil inside the module case 22 flows through spaces between the respective cylindrical battery cells 24 horizontally. In this case, the oil directly contacts bodies of the cylindrical battery cells 24. The oil inside the module case 22 exchanges heat directly with all the cylindrical battery cells 24 while flowing inside the module case 22.

Also, in the present embodiment, the oil is supplied and discharged from side surfaces of each module case 22. In other words, the inlet and the outlet of each module case 22 are provided in the aforementioned vicinities P of opposite corners positions in side surfaces of the case. More specifically, a structure of the battery unit 20 will be described with reference to FIGS. 6 and 7.

Figure 6:
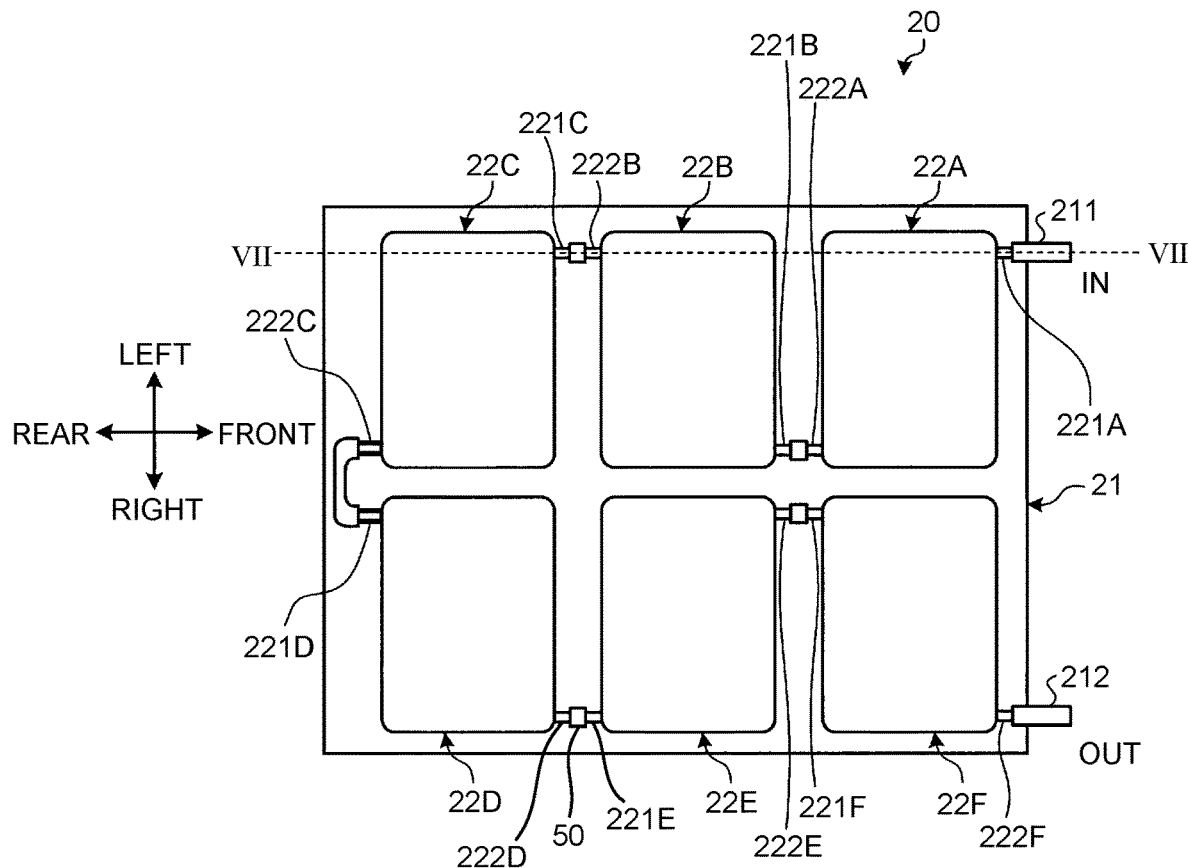
FIG. 6 is a diagram schematically illustrating connection portions between respective module cases.
Figure 7:
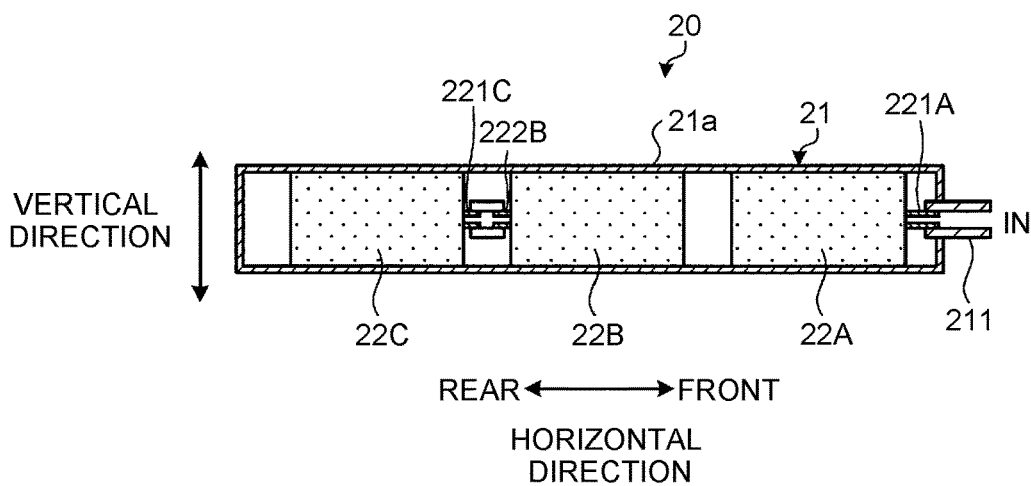
FIG. 7 is a diagram schematically illustrating a cross-section along line VII-VII in FIG. 6.

FIG. 6 is a diagram schematically illustrating connection portions between the respective module cases 22. FIG. 7 is a diagram schematically illustrating a cross-section along line VII-VII in FIG. 6. In FIG. 6, a skeleton diagram as the battery pack 21 is viewed from the upper surface 21a side is illustrated. Also, the flow of the oil inside the battery pack 21 illustrated in FIG. 6 is the same as the flow illustrated in FIG. 2.

In the example in FIG. 6, inside the battery pack 21, a first module case 22A, a second module case 22B, a third module case 22C, a fourth module case 22D, a fifth module case 22E and a sixth module case 22F are housed. The first to sixth module cases 22A to 22F are arranged in two rows in the right-left direction inside the battery pack 21 and connected in series such that the oil can flow therethrough.

In side surfaces of each module case 22 (22A to 22F), an inlet 221 (221A, 221B, 221C, 221D, 221E, 221F) via which the oil flows into the module case 22 and an outlet 222 (222A, 222B, 222C, 222D, 222E, 222F) via which the oil flows to the outside of the module case 22 are provided. The inlet 221 and the outlet 222 are provided in the vicinities of opposite corner positions as the module case 22 is viewed from the upper side. In the example illustrated in FIG. 6, the inlet 221 and the outlet 222 are provided in side surfaces on the opposite sides in the front-back direction and are located on the opposite sides in the right-left direction.

More specifically, in the first module case 22A, the inlet 221A is provided on the left side of a front side surface and the outlet 222A is provided on the right side of a rear side surface. In the second module case 22B, the inlet 221B is provided on the right side of a front side surface and the outlet 222B is provided on the left side of a rear side surface. In the third module case 22C, the inlet 221C is provided on the left side of a front side surface and the outlet 222C is provided on the right side of a rear side surface. In the fourth module case 22D, the inlet 221D is provided on the left side of a rear side surface and the outlet 222D is provided on the right side of a front side surface. In the fifth module case 22E, the inlet 221E is provided on the right side of a rear side surface and the outlet 222E is provided on the left side of a front side surface. In the sixth module case 22F, the inlet 221F is provided on the left side of a rear side surface and the outlet 222F is provided on the right side of a front side surface.

In side surfaces of the battery pack 21, an inlet 211 via which the oil circulating inside the cooling circuit 10 flows into the battery pack 21 and an outlet 212 via which the oil flows to the outside of the battery pack 21 are provided. The inlet 211 of the battery pack 21 is connected to the inlet 221A of the first module case 22A. The outlet 222A of the first module case 22A is connected to the inlet 221B of the second module case 22B. The outlet 222B of the second module case 22B is connected to the inlet 221C of the third module case 22C. The outlet 222C of the third module case 22C is connected to the inlet 221D of the fourth module case 22D. The outlet 222D of the fourth module case 22D is connected to the inlet 221E of the fifth module case 22E. The outlet 222E of the fifth module case 22E is connected to the inlet 221F of the sixth module case 22F. The outlet 222F of the sixth module case 22F is connected to the outlet 212 of the battery pack 21. Here, an inlet 221 of each module case 22 and an outlet 222 of a corresponding module case 22 may be connected via, e.g., a rubber tube. Also, the inlet 211 of the battery pack 21 and an inlet 221 of a module case 22 may be connected via, e.g., a rubber tube, and an outlet 222 of a module case 22 and the outlet 212 of the battery pack 21 may be connected via, e.g., a rubber tube.

Figure 8:
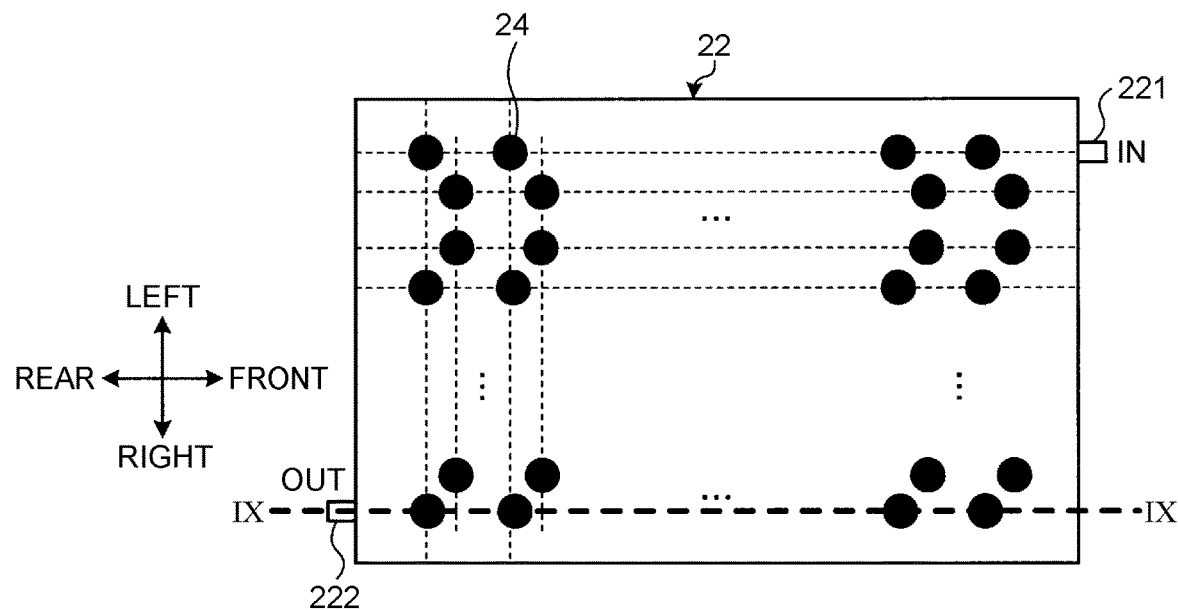
FIG. 8 is a diagram for describing a case where cylindrical battery cells are housed inside each module case illustrated in FIG. 6.
Figure 9:
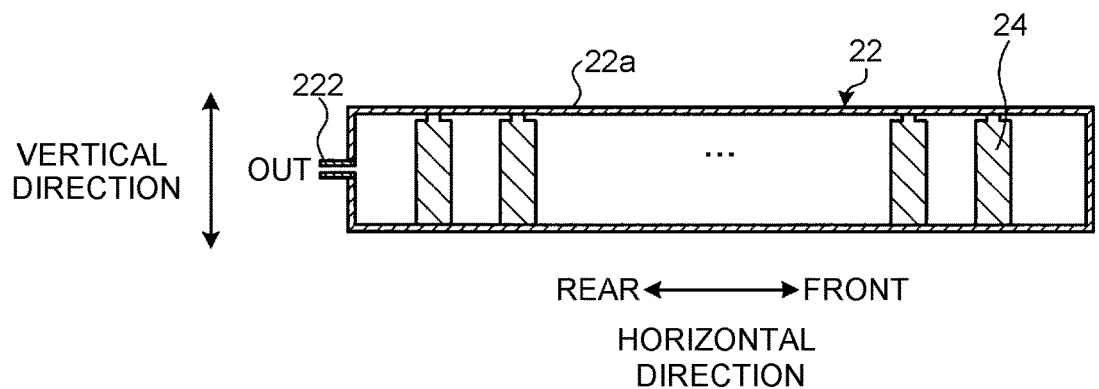
FIG. 9 is a diagram schematically illustrating a cross-section along line IX-IX in FIG. 8.
Figure 10:
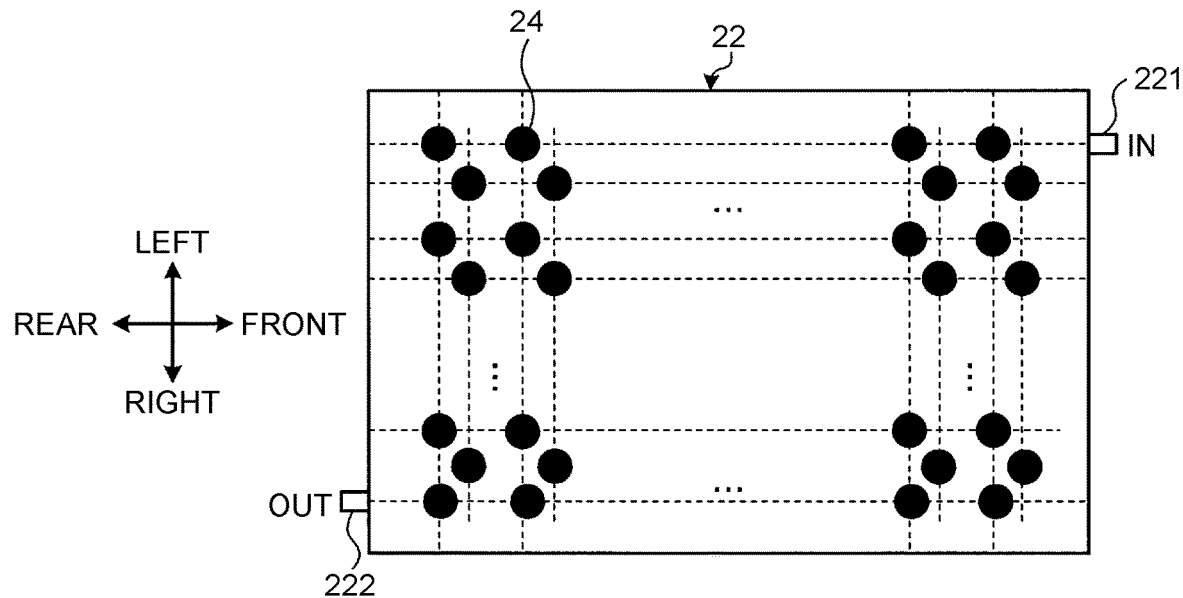
FIG. 10 is a diagram illustrating another example arrangement of cylindrical battery cells.
Figure 11:
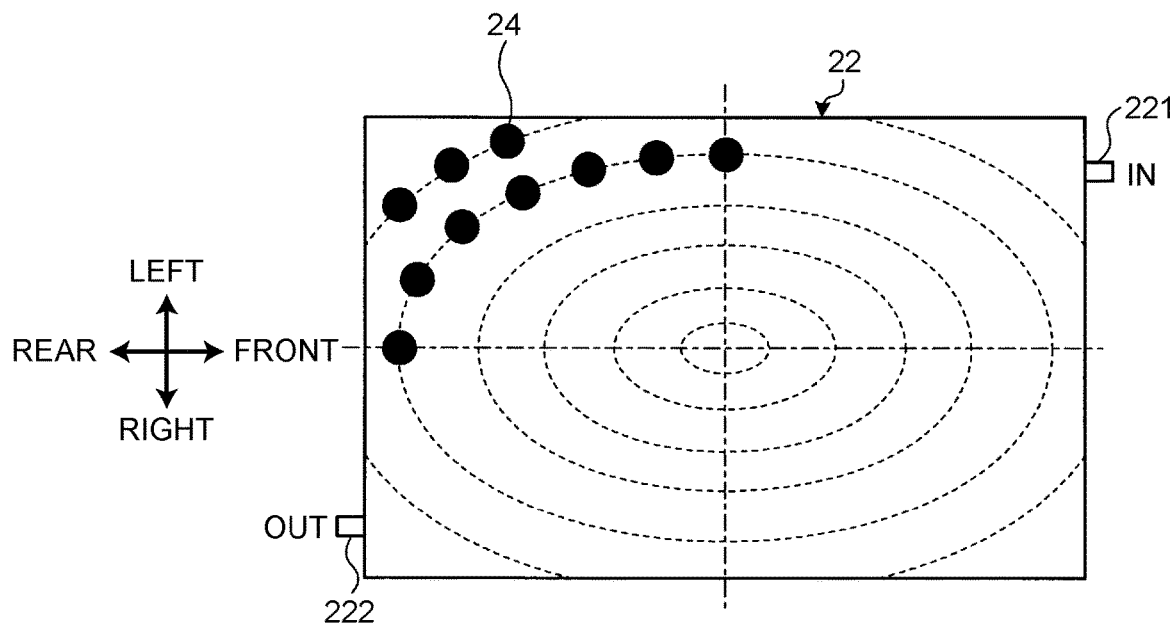
FIG. 11 is a diagram illustrating still another example arrangement of cylindrical battery cells.

Here, an example configuration in which cylindrical battery cells 24 are housed inside each module case 22 will be described with reference to FIGS. 8 to 11. FIG. 8 is a diagram illustrating an example arrangement of cylindrical battery cells 24 inside a module case 22. FIG. 9 is a cross-sectional diagram schematically illustrating a cross-section along line IX-IX in FIG. 8. FIG. 10 is a diagram illustrating another example arrangement of cylindrical battery cells 24. FIG. 11 is a diagram for describing still another arrangement of cylindrical battery cells 24. Here, FIG. 8 is a skeleton diagram of a module case 22 as viewed from the upper surface 22a side.

As illustrated in FIG. 8, a plurality of cylindrical battery cells 24 are regularly disposed inside the module case 22. In the example arrangement in FIG. 8, the cylindrical battery cells 24 are regularly disposed at respective intersections of lines extending in the front-rear direction and the right-left direction in a grid in a top view of the module case 22. In this case, as illustrated in FIG. 9, the cylindrical battery cells 24 are disposed so as to stand in the vertical direction. Also, the arrangement of the cylindrical battery cells 24 is not limited to the example arrangement illustrated in FIG. 8, and may be the arrangement illustrated in FIG. 10 or the arrangement illustrated in FIG. 11. In the example arrangement illustrated in FIG. 10, there are intersections of lines extending in the front-rear direction and the right-left direction in a grid in a top view of the module case 22, in which intersections each provided with a cylindrical battery cell 24 and intersections each provided with no cylindrical battery cell are alternately provided. In the example arrangement illustrated in FIG. 11, a plurality of cylindrical battery cells 24 are arranged concentrically with respect to a site that is the center of the module case 22. Here, the example arrangements in FIGS. 8, 10 and 11 are the same in density of battery cells inside the module case 22.

As described above, the battery cooling system 1 enables the battery cells provided in the battery unit 20 to be directly cooled by the oil circulating inside the cooling circuit 10. Consequently, an increase in size of the battery unit 20 can be suppressed and the capability of cooling the battery cells can be enhanced. In other words, the need for a refrigerant piping and a compressor such as those in conventional structures is eliminated, enabling reduction in size of the module cases 22 and suppression of an increase in size of the entire battery cooling system 1. Furthermore, as a result of the bodies of the battery cells (cell bodies) being directly cooled by the oil, the capability of cooling a separator and an electrolyte in each battery cell can substantially be enhanced. Furthermore, when the battery unit 20 is quickly charged with electric power or when the vehicle travels in a state in which the battery unit 20 has a high temperature, the battery unit 20 can effectively be cooled, enabling suppression of decrease in life of the battery due to heat. Consequently, electric power efficiency can substantially be enhanced.

Also, the high electric insulation property of the oil enables, for example, prevention of short-circuiting with battery terminals. Therefore, e.g., the battery cells of the battery unit 20 and the electronic devices of the PCU 40 can be cooled directly by the oil. Furthermore, the small polarity of the oil enables prevention of corrosion of a metal jacket (body surface) of each battery cell even if the oil comes into contact with the metal jacket. In addition, since the oil has a high boiling point and a high flash point, the oil is stable at a high temperature. Then, where the liquid is an oil, a pour point of the liquid is no more than $-30°$ C., and thus, even at a low temperature, the oil can be present in the form of liquid. Consequently, a necessary flow rate can be secured by the pump 11, enabling suppression of an increase in size of the pump 11. Thus, an increase in size of the entire battery cooling system 1 can be suppressed.

Also, in the cooling circuit 10, on the downstream side, in the oil circulation direction, of the radiator 12, components having lower limit temperatures are disposed in the order of the battery unit 20, the PCU 40 and the T/A unit 30, and thus, the oil that has flowed out from the radiator 12 can be made to flow through the components in ascending order of limit temperatures. Consequently, the battery unit 20, the PCU 40 and the T/A unit 30 reaching the respective limit temperatures can be suppressed. Also, where it is necessary to cool the battery unit 20, a sufficient cooling capability can be provided by increasing an amount of discharge from the pump 11.

Furthermore, since the PCU 40 and the T/A unit 30 are disposed inside the cooling circuit 10 including the battery unit 20, the battery unit 20 can be warmed by heat generated in the PCU 40 and heat generated in the T/A unit 30. In other words, the battery cells in the battery unit 20 can be warmed without using a heater. Then, the bodies of the battery cells (cell bodies) can be warmed directly by the liquid. Consequently, the capability of warming a positive electrode plate and a negative electrode plate of each battery cell is enhanced. Thus, a decrease in voltage at a cold temperature is reduced, ensuring an output of the motor.

In addition, the liquid is made to flow between opposite corners in each module case 22, ensuring a uniform flow speed of the liquid inside the module case 22. Consequently, non-uniformity of cooling inside the module case 22 can be suppressed, enhancing the capability of cooling the battery cells. Furthermore, in the case of laminated battery cells 23, the difference between pressure applied to the upper surface 23b of each laminated battery cell 23 from the liquid and pressure applied to the lower surface 23a from the liquid is eliminated. Also, in the case of cylindrical battery cells 24, cylindrical battery cells 24 are arranged as illustrated in FIGS. 8, 10 and 11, enabling reduction in loss of pressure of the liquid inside the module case 22.

Also, all the module cases 22 housed in the battery pack 21 are connected in series via the respective rubber tubes 50, whereby the flow rate of the liquid is increased and capability of releasing heat from (capability of cooling) the battery cells is enhanced.

The above-described battery cooling system 1 is applicable to not only an electric vehicle, but also to a hybrid vehicle using an engine and a motor as power sources for travelling.

Also, the liquid circulating inside the cooling circuit 10 is not limited to the above-described oil. However, water, LLC (engine coolant) and refrigerant (refrigerant of a refrigeration cycle for air conditioning) are excluded from the liquid circulating inside the cooling circuit 10.

Where the liquid circulating inside the cooling circuit 10 is an oil, it is desirable that the oil have a characteristic of having a low kinetic viscosity at a low temperature. Consequently, the liquid can be made to flow inside the cooling circuit 10 under a low-temperature environment, for example, in a temperature range in which the vehicle can be used.

Also, the inlet and the outlet of each module case 22 only need to be provided in the respective vicinities P of opposite corner positions, and thus are not limited to those in a structure in which the liquid is supplied and discharged from side surfaces of the module case 22. For example, a structure in which the liquid is supplied and discharged from an upper surface and/or a lower surface of a module case 22 may be employed. Here, a configuration in which a liquid is supplied and discharged from an upper surface each module case 22 will be described with reference to FIGS. 12 to 15.

Figure 12:
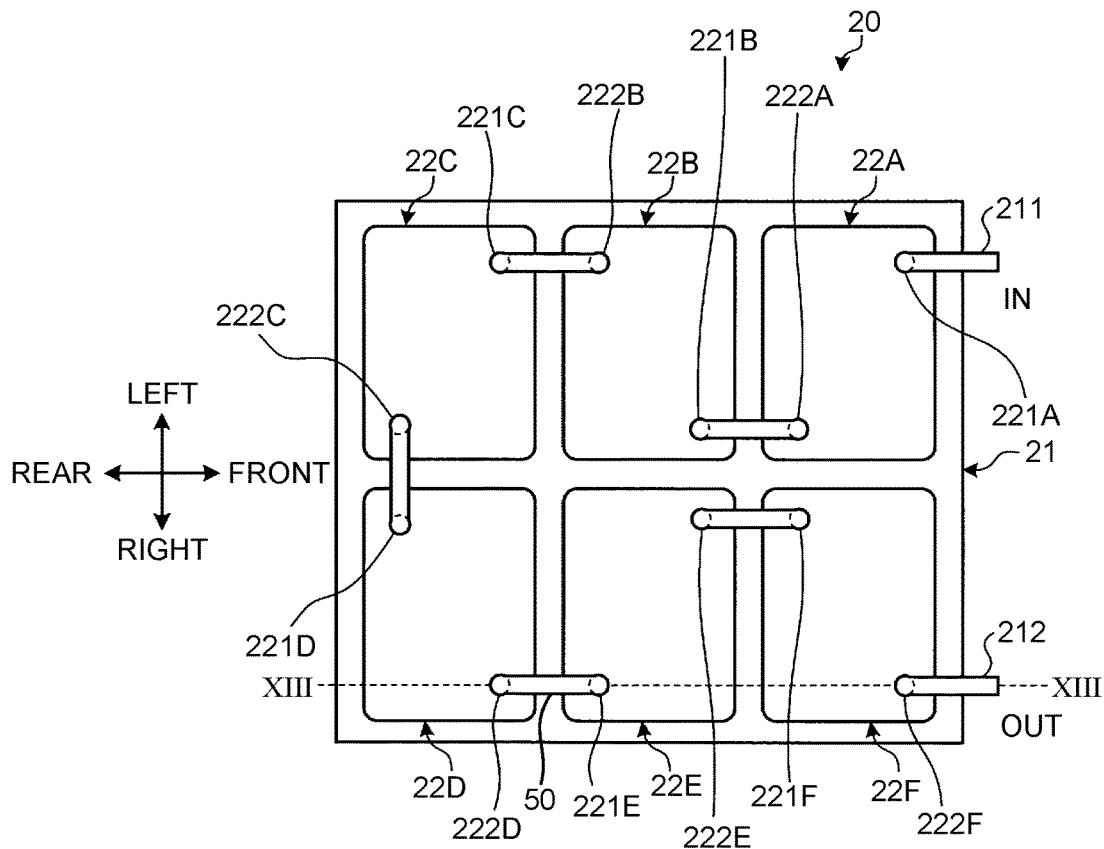
FIG. 12 is a diagram schematically illustrating another example configuration of connection portions between respective module cases.
Figure 13:
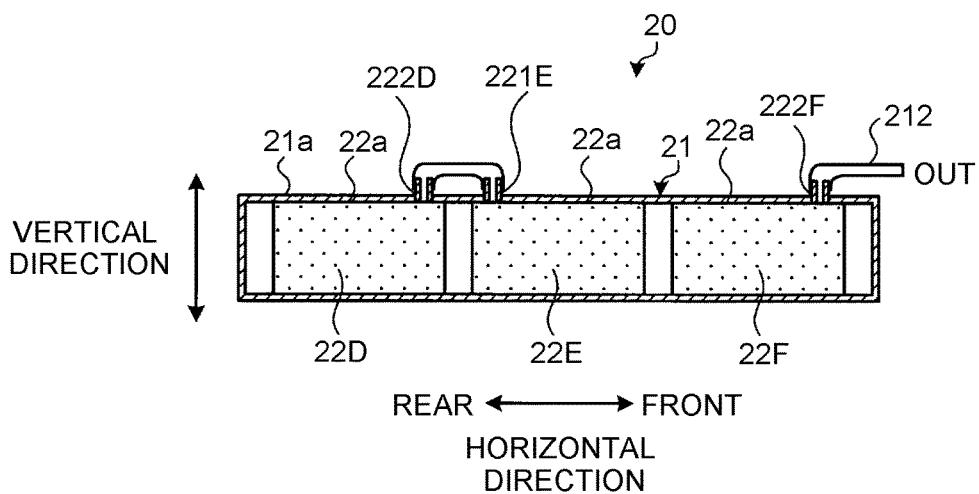
FIG. 13 is a diagram schematically illustrating a cross-section along line XIII-XIII in FIG. 12.
Figure 14:
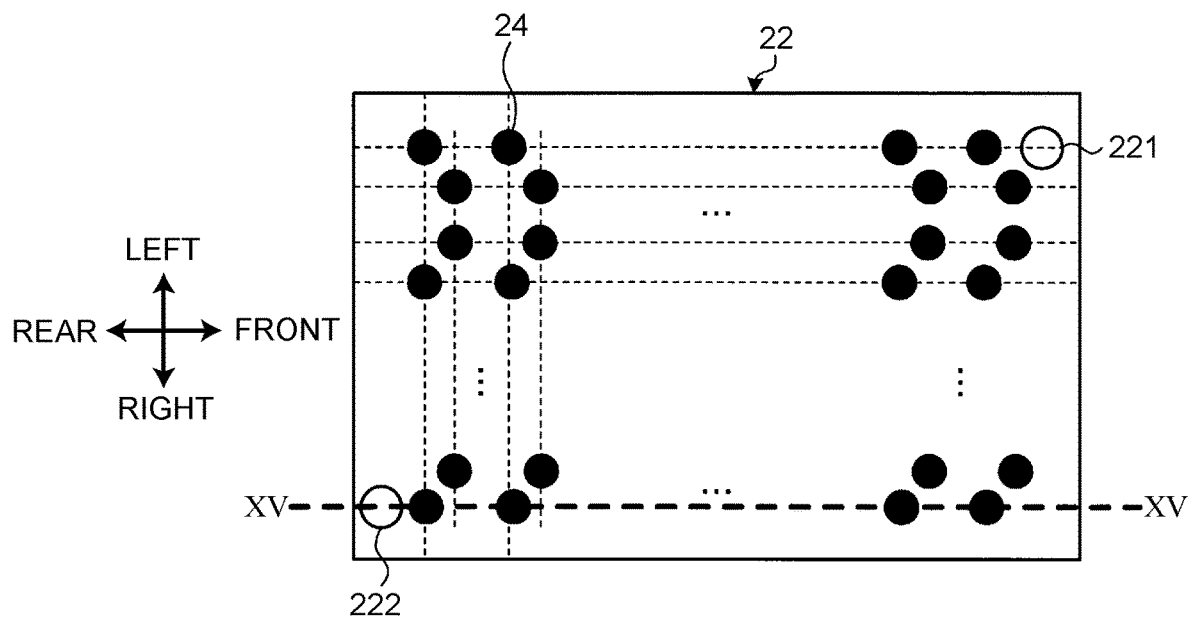
FIG. 14 is a diagram for describing a case where cylindrical battery cells are housed in each module case illustrated in FIG. 12.
Figure 15:
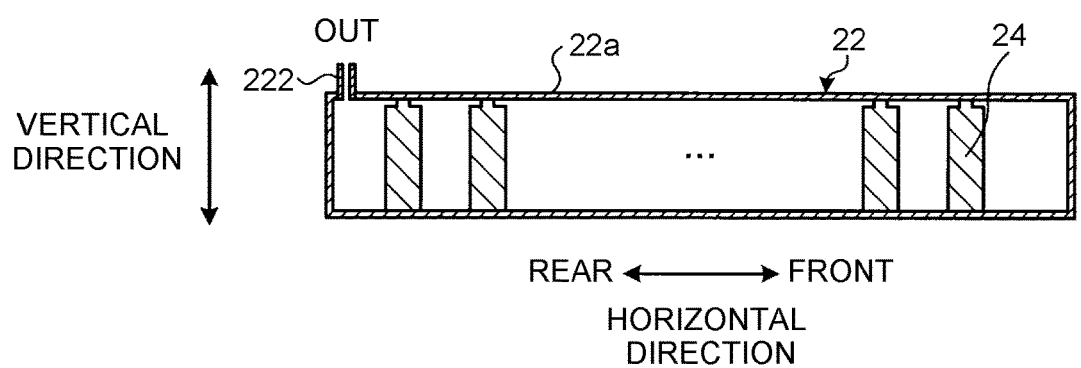
FIG. 15 is a diagram schematically illustrating a cross-section along line XV-XV in FIG. 14.

FIG. 12 is a diagram schematically illustrating another example configuration of connection portions between respective module cases 22. FIG. 13 is a diagram schematically illustrating a cross-section along line XIII-XIII in FIG. 12. FIG. 14 is a diagram for describing a configuration in which cylindrical battery cells 24 are housed inside each module case 22 illustrated in FIG. 12. FIG. 15 is a diagram schematically illustrating a cross-section along line XV-XV in FIG. 14. In FIG. 12, a top view of module cases 22 as viewed from the upper side is illustrated.

As illustrated in FIGS. 12 and 13, an inlet 211 and an outlet 212 are provided in an upper surface 21a of the battery pack 21. In this case, an inlet 221 (221A to 221F) and an outlet 222 (222A to 222F) are provided in opposite corner positions in an upper surface 22a of each of module cases 22 (22A to 22F). Also, the inlet 221 and the outlet 222 of a module case 22 are each connected to another outlet 222 or inlet 221 outside the battery pack 21. In the example illustrated in FIG. 13, the outlet 222D of the fourth module case 22D and the inlet 221E of the fifth module case 22E are connected via a rubber tube 50 outside the battery pack 21. As described above, where an inlet 221 and an outlet 222 are provided in an upper surface 22a of each module case 22, also, as illustrated in FIGS. 14 and 15, a plurality of cylindrical battery cells 24 can be regularly arranged inside the module case 22 as with the case illustrated in FIG. 8. Here, although not illustrated, where an inlet 221 and an outlet 222 are provided in an upper surface 22a of each module case 22, also, the inlet 221 and the outlet 222 may be each connected to another inlet 221 or outlet 222 inside the battery pack 21.

Figure 16:
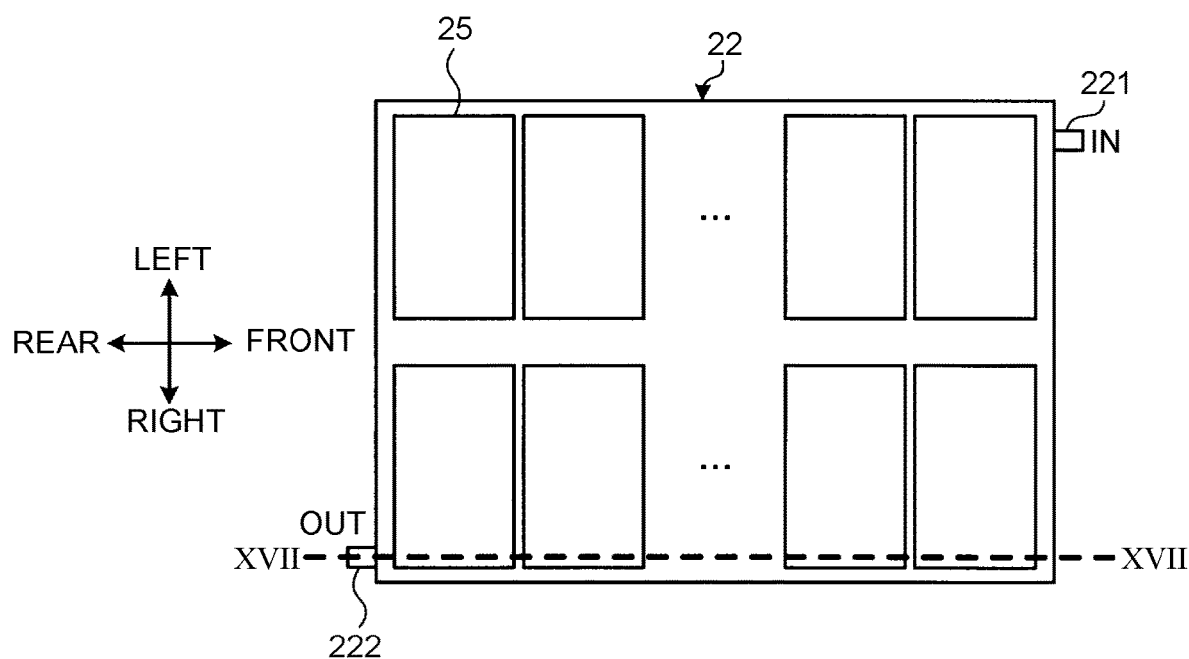
FIG. 16 is a diagram schematically illustrating a case where rectangular battery cells are housed in each module case illustrated in FIG. 6.
Figure 17:
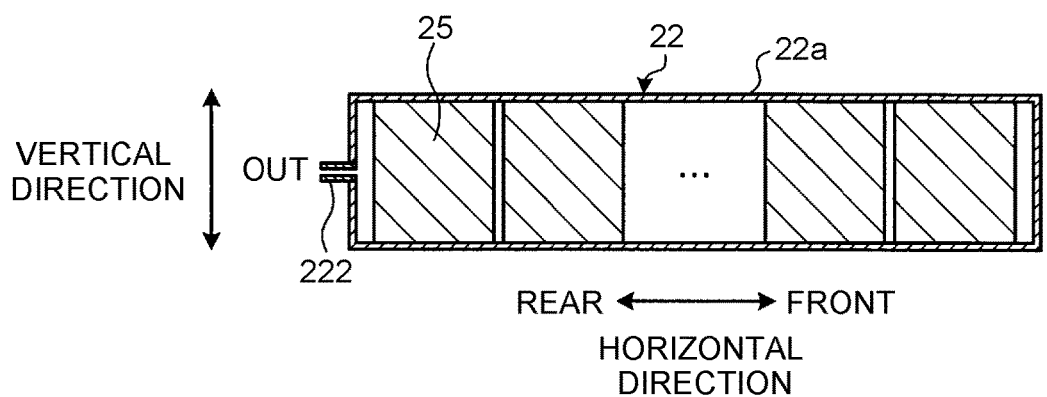
FIG. 17 is a diagram schematically a cross-section along line XVII-XVII in FIG. 16.
Figure 18:
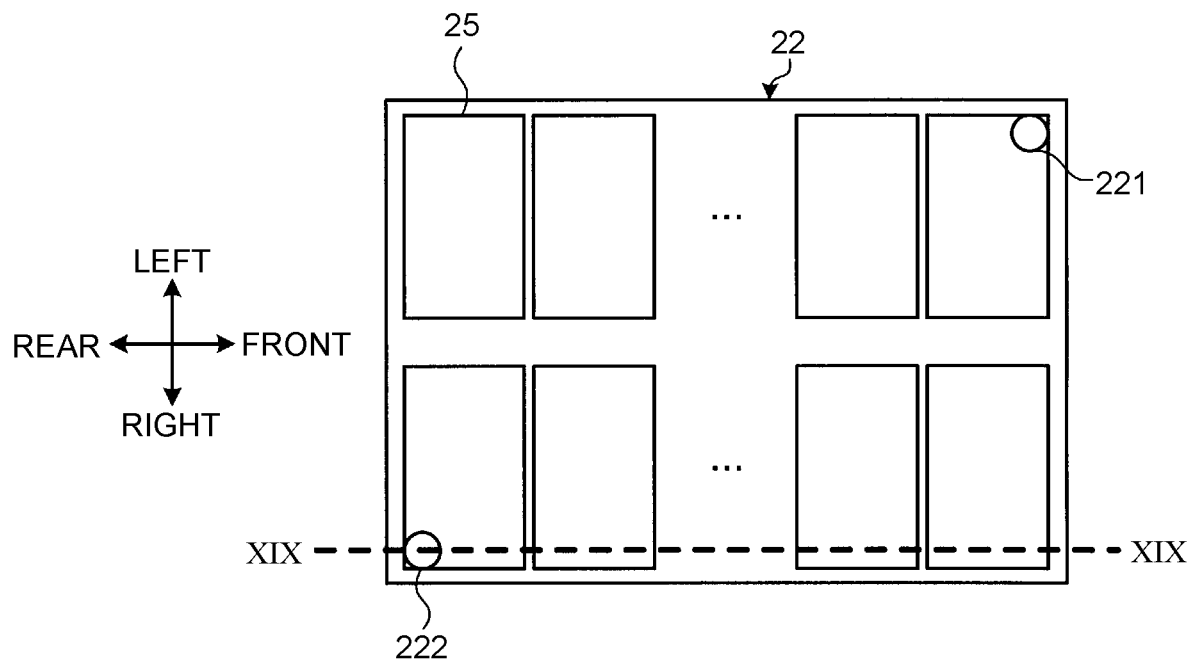
FIG. 18 is a diagram schematically illustrating a case where rectangular battery cells are housed in each module case illustrated in FIG. 12.
Figure 19:
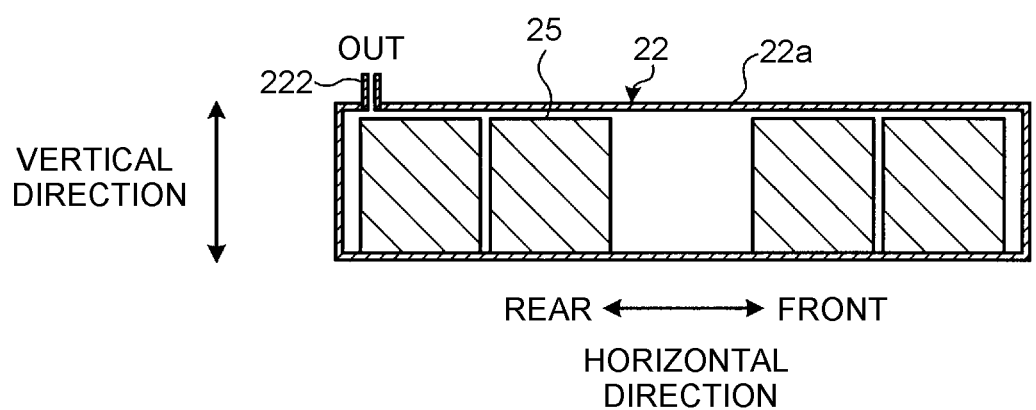
FIG. 19 is a diagram schematically illustrating a cross-section along line XIX-XIX in FIG. 18.

Also, battery cells housed inside each module case 22 may be rectangular battery cells. Here, a case where rectangular battery cells are housed in each module case 22 will be described with reference to FIGS. 16 to 19. FIG. 16 is a diagram for describing a case where an inlet 221 and an outlet 222 are provided in side surfaces of each module case 22. FIG. 17 is a diagram schematically illustrating a cross-section along line XVII-XVII of FIG. 16. FIG. 18 is a diagram for describing a case where an inlet 221 and an outlet 222 are provided in an upper surface 22a of each module case 22. FIG. 19 is a diagram schematically a cross-section along line XIX-XIX in FIG. 18.

As illustrated in FIGS. 16 and 17, a plurality of rectangular battery cells 25 arranged in two rows in the right-left direction are housed inside each module case 22 including an inlet 221 and an outlet 222 in side surfaces thereof. In this case, the oil flowing from the inlet 221 into the module case 22 flows through spaces among the rectangular battery cells 25 and flows to the outside of the module case 22 from the outlet 222.

As illustrated in FIGS. 18 and 19, a plurality of rectangular battery cells 25 are arranged in two rows in the right-left direction inside each module case 22 including an inlet 221 and an outlet 222 in an upper surface 22a thereof. The rectangular battery cells 25 are disposed so as to stand in the vertical direction. The outlet 222 of the module case 22 extends upward from the upper surface 22a.

Figure 20:
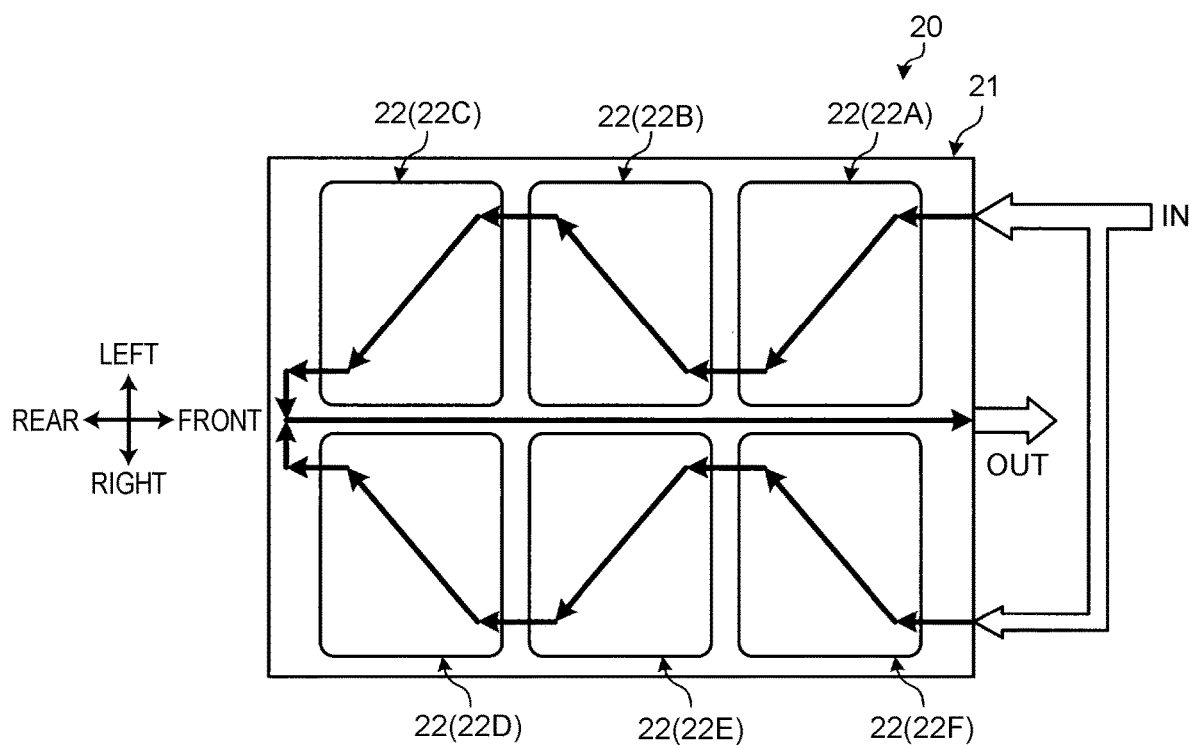
FIG. 20 is a diagram for describing a case where module cases are connected in parallel inside a battery pack.

Furthermore, the connection between the module cases 22 for the oil flow pathway is not limited to the serial connection illustrated in FIG. 2 and may be parallel connection. FIG. 20 is a diagram for describing a case where module cases 22 are connected in parallel inside each battery pack 21. As illustrated in FIG. 20, inside each battery pack 21, a first pathway connecting first to third module cases 22A to 22C and a second pathway connecting fourth to sixth module cases 22D to 22F may be formed in parallel. In the first pathway, the first module case 22A, the second module case 22B and the third module case 22C are disposed in this order from the upstream side toward the downstream side. In the second pathway, a sixth module case 22F, a fifth module case 22E and a fourth module case 22D are disposed in this order from the upstream side to the downstream side. As a result of the parallel connection of the halves of the plurality of module cases 22 disposed inside each battery pack 21 as described above, a supply temperature of the liquid is lowered and the capability of releasing heat from (capability of cooling) the battery cells is enhanced.

What is claimed is:

1. A battery cooling system comprising:
   a cooling circuit;
   a power transmission device disposed in the cooling circuit, the power transmission device transmitting power from an electric motor to drive wheels, the power transmission device including a gear;
   a drivetrain oil having an electric insulating property and being used for lubrication of the gear, the drivetrain oil circulating in the cooling circuit;
   a battery unit disposed in the cooling circuit, the battery unit including a plurality of module cases, each module case housing a plurality of battery cells;
   a pump disposed in the cooling circuit, the pump supplying the drivetrain oil to the battery unit and circulating the drivetrain oil inside the cooling circuit; and
   a radiator disposed in the cooling circuit, the radiator releasing heat from the drivetrain oil flowing in the cooling circuit,
   wherein:
   the drivetrain oil performs direct heat exchange inside the power transmission device and flows through an inside of each module case and performs direct heat exchange with the battery cells,
   each module case has a rectangular parallelepiped shape in which an inlet for the drivetrain oil for the module case and an outlet for the drivetrain oil for the module case are provided in vicinities of diagonally opposite corner positions as the module case is viewed from an upper side, and
   an outlet for the drivetrain oil of a first one of the plurality of module cases is fluidly connected to and positioned directly across from an inlet for the drivetrain oil of a second one of the plurality of module cases as the module cases are viewed from an upper side so that a flow pathway of the drivetrain oil flowing inside the battery unit is a series flow pathway.

2. The battery cooling system according to claim 1, wherein:
   a limit temperature of the battery unit is lower than a limit temperature of the power transmission device; and
   the drivetrain oil that has flowed out from the radiator is supplied to the power transmission device after flowing through the battery unit.

3. The battery cooling system according to claim 2, wherein the drivetrain oil has a pour point of no more than −30° C.

4. The battery cooling system according to claim 1, wherein:
   the cooling circuit includes a power control unit that converts direct-current electric power output by the battery unit into alternate-current electric power; and
   the drivetrain oil flows through an inside of a case of the power control unit and performs direct heat exchange with an electronic device housed inside the case.

5. A battery cooling system comprising:
   a cooling circuit in which a drivetrain oil used for lubrication of a gear of a power transmission device circulates, the drivetrain oil having an electric insulation property;
   the power transmission device disposed in the cooling circuit, the power transmission device transmitting power from an electric motor to drive wheels;
   a battery unit disposed in the cooling circuit, the battery unit including a plurality of module cases, each module case housing a plurality of battery cells;
   a pump disposed in the cooling circuit, the pump supplying the drivetrain oil to the battery unit and circulating the drivetrain oil inside the cooling circuit; and
   a radiator disposed in the cooling circuit, the radiator releasing heat from the drivetrain oil flowing in the cooling circuit,
   wherein:
   the drivetrain oil performs direct heat exchange inside the power transmission device and flows through an inside of each module case and performs direct heat exchange with the battery cells,
   each module case has a rectangular parallelepiped shape in which an inlet for the drivetrain oil for the module case and an outlet for the drivetrain oil for the module case are provided in vicinities of diagonally opposite corner positions as the module case is viewed from an upper side, and
   an outlet for the drivetrain oil of a first one of the plurality of module cases is fluidly connected to and positioned directly across from an inlet for the drivetrain oil of a second one of the plurality of module cases as the module cases are viewed from an upper side so that a flow pathway of the drivetrain oil flowing inside the battery unit is a series flow pathway.

\* \* \* \* \*